(12) United States Patent
Yamaoka

(10) Patent No.: US 10,293,833 B2
(45) Date of Patent: May 21, 2019

(54) DRIVING ASSISTANCE APPARATUS

(71) Applicants: TOYOTA JIDOSHA KABUSHIKI KAISHA, Aichi (JP); Masaaki Yamaoka, Susono (JP)

(72) Inventor: Masaaki Yamaoka, Susono (JP)

(73) Assignee: TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 549 days.

(21) Appl. No.: 14/428,400

(22) PCT Filed: Sep. 3, 2013

(86) PCT No.: PCT/JP2013/073711
§ 371 (c)(1),
(2) Date: Mar. 16, 2015

(87) PCT Pub. No.: WO2014/061360
PCT Pub. Date: Apr. 24, 2014

(65) Prior Publication Data
US 2015/0224995 A1 Aug. 13, 2015

(30) Foreign Application Priority Data
Oct. 17, 2012 (JP) .................... 2012-229857

(51) Int. Cl.
*B60W 40/105* (2012.01)
*B60W 40/107* (2012.01)
(Continued)

(52) U.S. Cl.
CPC .......... *B60W 40/107* (2013.01); *B60W 10/04* (2013.01); *B60W 10/06* (2013.01);
(Continued)

(58) Field of Classification Search
None
See application file for complete search history.

(56) References Cited

U.S. PATENT DOCUMENTS 5,239,472 A * 8/1993 Long .................. B61L 3/006
246/182 R
9,994,223 B2 * 6/2018 Poechmueller ... B60W 50/0097
(Continued)

FOREIGN PATENT DOCUMENTS

EP          2 688 054 A1    1/2014
JP       2009-244167 A     10/2009
(Continued)

*Primary Examiner* — Douglas King
(74) *Attorney, Agent, or Firm* — Sughrue Mion, PLLC

(57) ABSTRACT

A driving assistance apparatus includes: an estimation unit configured to estimate a brake-on vehicle speed as a vehicle speed at which a driver of a vehicle starts a brake operation, based on information related to deceleration of the vehicle and vehicle-speed information; a deceleration-operation-point calculation unit configured to calculate location information of a deceleration-operation point where the driver of the vehicle starts a deceleration operation, based on the brake-on vehicle speed; and an information presentation unit configured to present driving assistance information for prompting the driver of the vehicle to perform the deceleration operation, corresponding to the calculated location information of the deceleration-operation point and a running position of the vehicle.

5 Claims, 3 Drawing Sheets

(51) Int. Cl.
*B60W 10/04* (2006.01)
*B60W 10/06* (2006.01)
*B60W 10/18* (2012.01)
*B60W 40/076* (2012.01)
*G08G 1/16* (2006.01)
*B60W 40/10* (2012.01)
*B60W 50/14* (2012.01)
*G01P 15/00* (2006.01)
*G08G 1/0962* (2006.01)

(52) U.S. Cl.
CPC .......... *B60W 10/18* (2013.01); *B60W 40/076* (2013.01); *B60W 40/1005* (2013.01); *B60W 40/105* (2013.01); *B60W 50/14* (2013.01); *G01P 15/00* (2013.01); *G08G 1/16* (2013.01); *G08G 1/09626* (2013.01)

(56) References Cited

U.S. PATENT DOCUMENTS

| | | | | |
|---|---|---|---|---|
| 2005/0134440 A1* | 6/2005 | Breed | ................. | B60N 2/2863 340/435 |
| 2011/0307122 A1* | 12/2011 | Kanning | ......... | B60W 30/18072 701/1 |
| 2013/0338852 A1 | 12/2013 | Otake et al. | | |

FOREIGN PATENT DOCUMENTS

| | | |
|---|---|---|
| JP | 2011150598 A | 8/2011 |
| WO | 2012/127568 A1 | 9/2012 |

\* cited by examiner

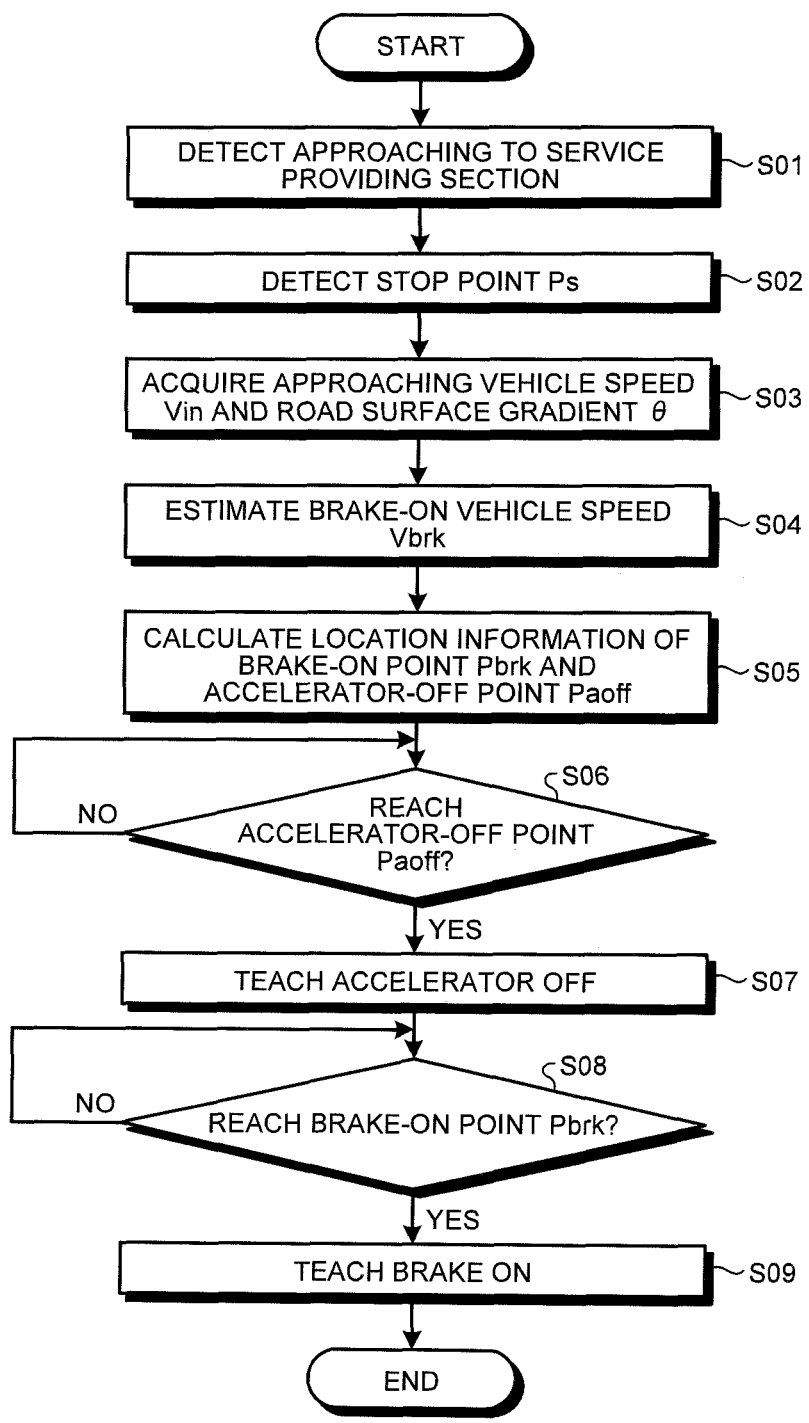

DRIVING ASSISTANCE APPARATUS

CROSS REFERENCE TO RELATED APPLICATIONS

This is a National Stage of International Application No. PCT/JP2013/073711 filed Sep. 3, 2013, claiming priority based on Japanese Patent Application No. 2012-229857 filed Oct. 17, 2012, the contents of all of which are incorporated herein by reference in their entirety.

FIELD

The present invention relates to a driving assistance apparatus.

BACKGROUND

Conventionally, as one of driving assistance technologies for assisting driving of a vehicle by a driver, there is known a technique that teaches a driver to perform a deceleration operation when the vehicle stops. For example, Patent Literature 1 discloses the driving assistance apparatus that computes the distance reachable by freewheeling after accelerator off and the distance until vehicle stop by a brake operation, and teaches a driver the timing of a deceleration operation (an accelerator-off operation and a brake-on operation) when the vehicle approaches a stop point based on these computed distances.

CITATION LIST

Patent Literature

Patent Literature 1: Japanese Patent Application Laid-open No. 2009-244167

SUMMARY

Technical Problem

However, in the conventional driving assistance apparatus described in Patent Literature 1, for example, in the case where the running condition of the vehicle and the road surface condition are changed or similar case, the timing for teaching the deceleration operation might differ from the feeling of the driver such that the driver might feel uncomfortable. Thus, in the conventional technique, there is room for improvement to calculate the timing for teaching the deceleration operation that is less likely to give the driver uncomfortable feeling during deceleration.

The present invention has been made in view of the above-described circumstances, and it is an object of the present invention to provide a driving assistance apparatus that is less likely to give the driver uncomfortable feeling when performing a driving assistance for teaching a driver a deceleration operation.

Solution to Problem

To solve the above-described problem, a driving assistance apparatus according to the present invention includes: estimation means configured to estimate a brake-on vehicle speed as a vehicle speed at which a driver of a vehicle starts a brake operation, based on information related to deceleration of the vehicle and vehicle-speed information; deceleration-operation-point calculation means configured to calculate location information of a deceleration-operation point where the driver of the vehicle starts a deceleration operation, based on the brake-on vehicle speed; and information presentation means configured to present driving assistance information for prompting the driver of the vehicle to perform the deceleration operation, corresponding to the calculated location information of the deceleration-operation point and a running position of the vehicle.

Moreover, in the above-described driving assistance apparatus, it is preferable that the deceleration operation includes an accelerator-off operation and a brake-on operation, the deceleration-operation point includes an accelerator-off point where the accelerator-off operation is to be started and a brake-on point where the brake-on operation is to be started, the deceleration-operation-point calculation means is configured to: predict the brake-on point based on location information of a stop point where the vehicle is to be stopped and the brake-on vehicle speed; calculate a distance reachable after execution of the accelerator-off operation until the vehicle speed of the vehicle is decelerate to the brake-on vehicle speed; and set a position at a near side with respect to the brake-on point by the distance, as the accelerator-off point, and the information presentation means is configured to present the driving assistance information for prompting the accelerator-off operation to the driver corresponding to location information of the set accelerator-off point and the running position of the vehicle.

Moreover, in the above-described driving assistance apparatus, it is preferable that the information related to deceleration includes at least one of a road surface gradient, a road load, and an air resistance.

Advantageous Effects of Invention

The driving assistance apparatus according to the present invention calculates the brake-on vehicle speed based on the speed information and the information related to the deceleration of the vehicle, so as to allow accurately estimating the brake-on vehicle speed corresponding to the running condition of the vehicle and the road surface condition. This allows presenting the driving assistance information, which prompts the driver to perform the deceleration operation, at the appropriate timing so as to provide the timing for teaching the deceleration operation close to the feeling of the driver. With this result, the driving assistance apparatus according to the present invention can provides the effect that is less likely to give the driver uncomfortable feeling when performing the driving assistance for teaching the deceleration operation to the driver.

BRIEF DESCRIPTION OF DRAWINGS

FIG. 5 is a flowchart of a stop-operation assistance process executed by the driving assistance apparatus according to this embodiment.

DESCRIPTION OF EMBODIMENTS

Figure 1:
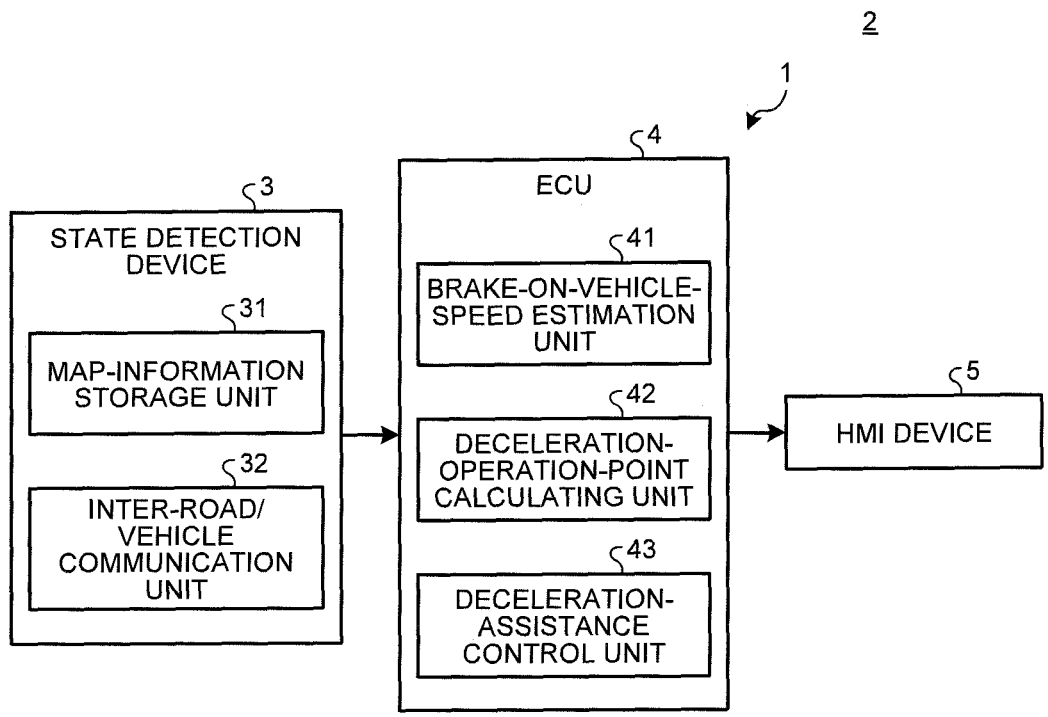
FIG. 1 is a block diagram illustrating a schematic configuration of a driving assistance apparatus according to one embodiment of the present invention.

Embodiments of a driving assistance apparatus according to the present invention will be described below based on the accompanying drawings. Like reference numerals designate corresponding or identical elements throughout the drawings below, and therefore such elements will not be further repeatedly elaborated here.

Figure 2:
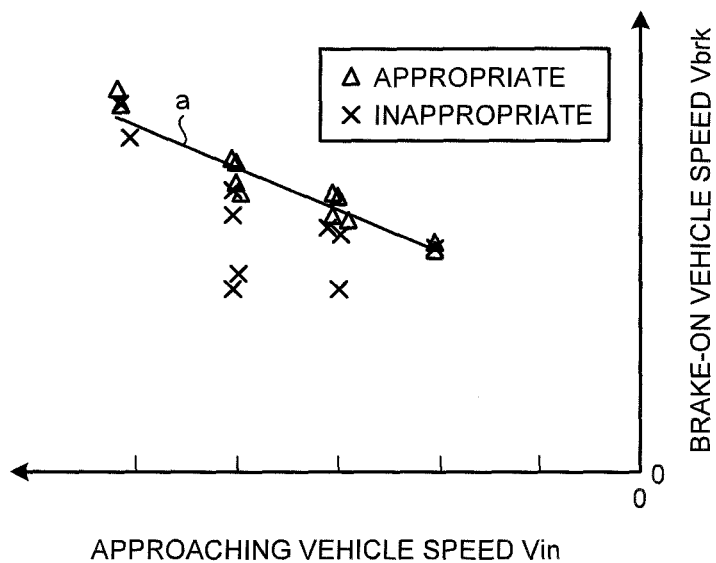
FIG. 2 is a graph illustrating the relationship between a brake-on vehicle speed at an appropriate assistance timing and an approaching vehicle speed to a service providing section.
Figure 3:
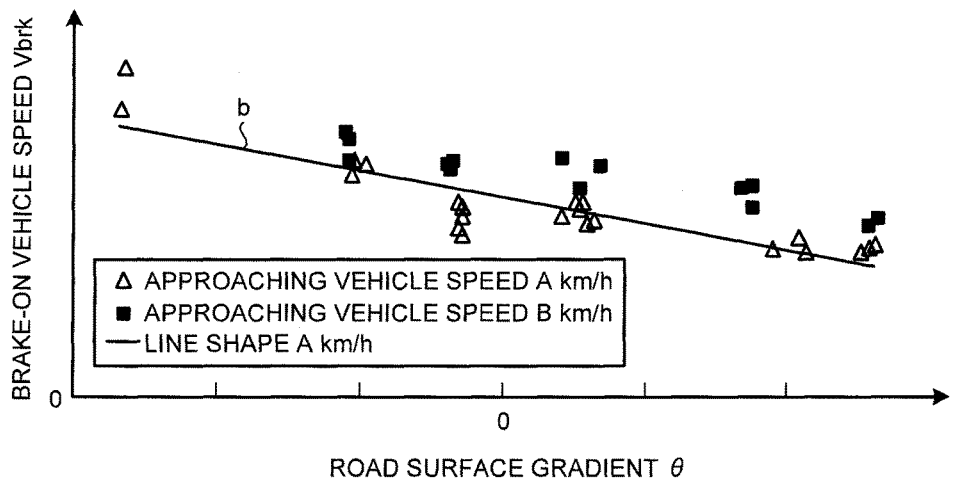
FIG. 3 is a graph illustrating the relationship between a brake-on vehicle speed at an appropriate assistance timing and a road surface gradient in the service providing section.
Figure 4:
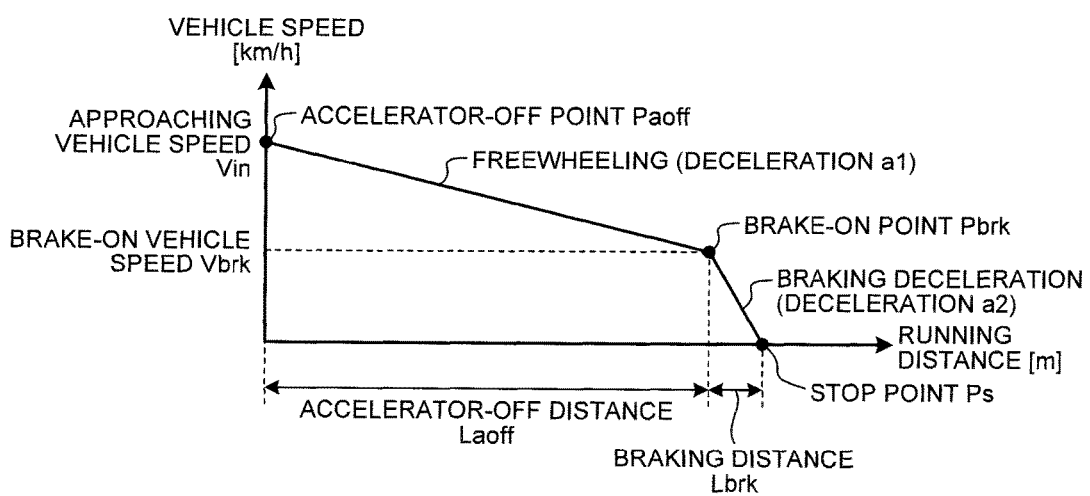
FIG. 4 is a graph illustrating an exemplary speed transition of a vehicle speed during a deceleration operation.

Firstly, a description will be given of the configuration of a driving assistance apparatus 1 according to this embodiment with reference to FIGS. 1 to 4. FIG. 1 is a block diagram illustrating the schematic configuration of the driving assistance apparatus 1 according to one embodiment of the present invention. FIG. 2 is a graph illustrating the relationship between a brake-on vehicle speed at an appropriate assistance timing and an approaching vehicle speed to a service providing section. FIG. 3 is a graph illustrating the relationship between a brake-on vehicle speed at an appropriate assistance timing and a road surface gradient in the service providing section. FIG. 4 is a graph illustrating an exemplary speed transition of a vehicle speed during a deceleration operation.

As illustrated in FIG. 1, the driving assistance apparatus 1 is mounted on a vehicle 2 as own vehicle and includes a state detection device 3, an electronic control unit (ECU) 4, and a human machine interface (HMI) device 5. The driving assistance apparatus 1 assists safety driving of the vehicle 2 by the driver such that the ECU 4 controls the HMI device 5 to present various pieces of driving assistance information to the driver of the vehicle 2 based on information acquired by the state detection device 3.

Especially in this embodiment, in the case where there is a stop point Ps where the vehicle 2 needs to stop ahead of a running route of the vehicle 2, within a service providing section set to be in a range at the near side of the running route from the stop point Ps, the driving assistance apparatus 1 displays the driving assistance information on the HMI device 5 to prompt the driver to perform a deceleration operation for stopping the vehicle 2 at the stop point Ps. The deceleration operation as a target of the driving assistance includes an accelerator-off operation and a brake-on operation. The accelerator-off operation returns the accelerator pedal so as to decelerate (for example, decelerate using an engine brake or a regeneration torque). The brake-on operation depresses the brake pedal so as to decelerate using a foot brake. As the stop point Ps where the vehicle 2 needs to stop, there are, for example, an intersection, a crosswalk point, a T-junction, a point facing a shop entrance, a temporary stop line, and similar point (see FIG. 4 for the stop point Ps). For example, the driving assistance apparatus 1 according to this embodiment can determine the stop point Ps (such as the temporary stop line) where the vehicle 2 needs to stop based on map information stored in a map-information storage unit 31. The driving assistance apparatus 1 can also determine the stop point Ps where the vehicle 2 needs to stop (for example, when the traffic signal turns red at the timing reaching an intersection) based on the switching timing, which is acquired by an inter-road/vehicle communication unit 32, of the traffic signal display at the intersection and the intersection reach timing of the vehicle 2. Here, the configuration members in the state detection device 3 below except the map-information storage unit 31 and the inter-road/vehicle communication unit 32 may be used to determine the existence of the stop point Ps as a configuration.

The vehicle 2 includes any one of an engine, a motor, and similar member as a running drive source for rotatably driving a drive wheel. The vehicle 2 may be any type of vehicle such as a hybrid vehicle including both an engine and a motor, a conventional vehicle that includes an engine while not including a motor, and an EV vehicle that includes a motor while not including an engine.

The state detection device 3 detects the state of the vehicle 2 and the state of the peripheral area of the vehicle 2. The state detection device 3 detects various state quantities and physical quantities representing the state of the vehicle 2, the operating states of the switches, and similar state. The state detection device 3 is electrically coupled to the ECU 4, and outputs various signal to this ECU 4. In this embodiment, the state detection device 3 detects information related to the stop point Ps ahead of the course of the vehicle 2. The state detection device 3 has the configuration that includes, for example, a camera, radar, a car navigation device, the map-information storage unit 31, the inter-road/vehicle communication unit 32, an inter-vehicle communication unit, a wireless communication device, a vehicle speed sensor, an accelerator pedal sensor, the brake pedal sensor, and similar member.

The ECU 4 controls the respective units of the vehicle 2 based on various information input from the state detection device 3. Especially in this embodiment, the ECU 4 executes the driving assistance for prompting the driver of the vehicle 2 to perform a the deceleration operation (the accelerator-off operation and the brake-on operation) corresponding to the extent that the vehicle 2 approaches the stop point Ps ahead of the course. For this driving assistance, the ECU 4 is configured to achieve the respective functions of a brake-on-vehicle-speed estimation unit 41 (estimation means), a deceleration-operation-point calculating unit 42 (deceleration-operation-point calculation means), and a deceleration-assistance control unit 43.

The brake-on-vehicle-speed estimation unit 41 estimates a brake-on vehicle speed Vbrk, which is a vehicle speed at which the driver of the vehicle 2 starts the brake-on operation. The brake-on-vehicle-speed estimation unit 41 estimates the brake-on vehicle speed Vbrk based on an approaching vehicle speed Vin (vehicle-speed information) when the vehicle 2 approaches the service providing section and a road surface gradient (information related to deceleration of the vehicle) of the service providing section.

Here, with reference to FIGS. 2 and 3, a description will be given of the relationship between: the brake-on vehicle speed Vbrk; and the approaching vehicle speed Vin and the road surface gradient $\theta$. FIG. 2 illustrates the result of investigation of the brake-on vehicle speed Vbrk at the appropriate assistance timing for each approaching vehicle speed Vin. In FIG. 2, the vertical axis denotes the brake-on vehicle speed Vbrk and the horizontal axis denotes the approaching vehicle speed Vin. In this investigation, it was determined whether or not the driver felt that the timing of the driving assistance was appropriate in the case where the driving assistance for prompting the brake-on operation was performed when the vehicle approached the service providing section at a predetermined approaching vehicle speed Vin and decelerated to a plurality of patterns of the brake-on vehicle speed Vbrk. This investigation was carried out on a plurality of patterns of the approaching vehicle speed Vin. In FIG. 2, regarding the respective plurality of combinations of the approaching vehicle speed Vin and the brake-on vehicle speed Vbrk, which are set as just described, the combination where the driver felt that the assistance timing was appropriate is plotted with "Δ" marks and the combination where the driver felt inappropriate is plotted with "x" marks.

As illustrated in FIG. 2, the plot group with the Δ marks can be illustrated by an approximate straight line a. According to this approximate straight line a, it is found that the brake-on vehicle speed Vbrk tends to be proportional to the approaching vehicle speed Vin. That is, the brake-on vehicle speed Vbrk felt as the appropriate assistance timing becomes lower as the approaching vehicle speed Vin becomes lower. On the other hand, the brake-on vehicle speed Vbrk felt as the appropriate assistance timing becomes higher as the approaching vehicle speed Vin becomes higher.

FIG. 3 illustrates the result of investigation of the brake-on vehicle speed Vbrk at the appropriate assistance timing for each road surface gradient θ. In FIG. 3, the vertical axis denotes the brake-on vehicle speed Vbrk and the horizontal axis denotes the road surface gradient θ. In this investigation, it was determined whether or not the driver felt that the timing of the driving assistance was appropriate in the case where the driving assistance for prompting the brake-on operation was performed when the vehicle decelerated to a plurality of patterns of the brake-on vehicle speed Vbrk in the same service providing section. This investigation was carried out in a plurality of service providing sections having a plurality of patterns of the road surface gradient θ. Also, this investigation was carried out in the case where the approaching vehicle speed to the service providing section was set to two types of A and B (here, A<B). In FIG. 3, regarding the respective plurality of combinations of the road surface gradient θ and the brake-on vehicle speed Vbrk, which are set as just described, the combination at the approaching vehicle speed A is plotted with "Δ" marks and the combination at the approaching vehicle speed B is plotted with "☐ (black square)" marks among the combinations where the driver felt that the assistance timing was appropriate. Also in FIG. 3, an approximate straight line b is illustrated as one example. The plot group with the Δ marks is linearly approximated by the approximate straight line b.

As illustrated by this approximate straight line b, it is found that the brake-on vehicle speed Vbrk tends to be proportional to the road surface gradient θ. That is, the brake-on vehicle speed Vbrk felt as the appropriate assistance timing becomes lower as the road surface gradient θ becomes larger in the positive direction (the uphill gradient becomes larger). On the other hand, the brake-on vehicle speed Vbrk felt as the appropriate assistance timing becomes higher as the road surface gradient θ becomes larger in the negative direction (the downhill gradient becomes larger).

Based on the investigation results illustrated in FIGS. 2 and 3, it is considered that the brake-on vehicle speed Vbrk felt as the appropriate assistance timing tends to be proportional to the approaching vehicle speed Vin and the road surface gradient θ and varies corresponding to the approaching vehicle speed Vin or the road surface gradient θ. According to the above-described results, in this embodiment, the brake-on-vehicle-speed estimation unit 41 calculates the brake-on vehicle speed Vbrk with the following formula (1).

$$Vbrk = \alpha(Vin - \beta) + \gamma \cdot \theta \quad (1)$$

Here, Vin is an approaching vehicle speed, θ is a road surface gradient, α is the slope of the line a in FIG. 2, β is the intercept in FIG. 2, and γ is the slope of the line b in FIG. 3. The brake-on-vehicle-speed estimation unit 41 can acquire the information of the approaching vehicle speed Vin and the road surface gradient θ from the state detection device 3.

The deceleration-operation-point calculating unit 42 calculates the timing for prompting the driver of the vehicle 2 to perform the deceleration operation (the accelerator-off operation and the brake-on operation). In other words, the deceleration-operation-point calculating unit 42 calculates location information of a deceleration-operation point where the driver of the vehicle 2 starts the deceleration operation, that is, calculates location information of an accelerator-off point Paoff where the driver starts the accelerator-off operation and a brake-on point Pbrk where the driver starts the brake-on operation.

Here, with reference to FIG. 4, a description will be given of the relationship between the vehicle speed and the running distance during the deceleration operation of the vehicle 2. FIG. 4 is a graph illustrating an exemplary speed transition of the vehicle speed during the deceleration operation. The vertical axis denotes the vehicle speed and the horizontal axis denotes the running distance. As illustrated in FIG. 4, the vehicle 2 approaches the service providing section at the approaching vehicle speed Vin and the accelerator-off operation is started at the accelerator-off point Paoff. Then, the vehicle speed is decelerated to the brake-on vehicle speed Vbrk from the approaching vehicle speed Vin at a constant rate by a deceleration a1 generated by the engine brake during freewheeling after accelerator off (the running distance of the vehicle 2 in this period is defined as an accelerator-off distance Laoff). At the brake-on point Pbrk where the vehicle speed is decelerated to the brake-on vehicle speed Vbrk, the brake-on operation is started. Then, the vehicle speed is further decelerated by a deceleration a2 generated by the foot brake during the braking deceleration, and the vehicle speed becomes zero at the stop point Ps such that the vehicle stops (the running distance of the vehicle 2 in this period is defined as a braking distance Lbrk).

The deceleration-operation-point calculating unit 42 predicts the brake-on point Pbrk where the brake-on operation is to be started based on the location information of the stop point Ps and the brake-on vehicle speed Vbrk calculated by the brake-on-vehicle-speed estimation unit 41. The deceleration-operation-point calculating unit 42 firstly calculates the braking distance Lbrk needed from the brake-on vehicle speed Vbrk to the stop during the braking deceleration. The braking distance Lbrk can be calculated using the formula of a well-known uniformly-accelerated motion from, for example, the deceleration a2, which is generated in the vehicle 2 during the braking deceleration, and the brake-on vehicle speed Vbrk. The deceleration a2, which is generated in the vehicle 2 during the braking deceleration, can be appropriately set corresponding to, for example, the mechanical properties of the vehicle 2 and the foot brake. The deceleration-operation-point calculating unit 42 sets the point at the near side with respect to the stop point Ps by the braking distance Lbrk as the brake-on point Pbrk.

The deceleration-operation-point calculating unit 42 estimates the accelerator-off point Paoff where the accelerator-off operation is to be started, based on the location information of the stop point Ps, the brake-on vehicle speed Vbrk calculated by the brake-on-vehicle-speed estimation unit 41, the location information of the brake-on point Pbrk. The deceleration-operation-point calculating unit 42 firstly calculates the accelerator-off distance Laoff reachable after execution of the accelerator-off operation until the vehicle speed of the vehicle 2 is decelerated to the brake-on vehicle speed Vbrk. The accelerator-off distance Laoff can be calculated, for example, using the formula of a well-known uniformly-accelerated motion, based on the approaching vehicle speed Vin when the vehicle 2 approaches the service providing section, the brake-on vehicle speed Vbrk, and the deceleration a1 generated in the vehicle 2 during freewheeling after the accelerator-off operation. The deceleration a1 generated in the vehicle 2 during freewheeling can be set as necessary corresponding to, for example, the mechanical properties of the vehicle 2, the engine, the power transmission device, and similar member. The deceleration-operation-point calculating unit 42 sets the point at the near side with respect to the brake-on point Pbrk by the accelerator-off distance Laoff, that is, the point at the near side with respect to the stop point Ps by the distance of Lbrk+Laoff, as the accelerator-off point Paoff.

The deceleration-assistance control unit 43 performs an output control of the driving assistance information for prompting the driver to perform the accelerator-off operation and the brake-on operation based on the calculated location information of the accelerator-off point Paoff and the brake-on point Pbrk by the deceleration-operation-point calculating unit 42. For example, the deceleration-assistance control unit 43 acquires the information related to the current position of the vehicle 2 from the state detection device 3 so as to compare the location information of the accelerator-off point Paoff set by the deceleration-operation-point calculating unit 42 with the current position. When the vehicle 2 reaches the accelerator-off point Paoff or within a predetermined range at the near side of the accelerator-off point Paoff, the deceleration-assistance control unit 43 controls the HMI device 5 to present the driving assistance information, which prompts the accelerator-off operation, to the driver. In the case where the deceleration-assistance control unit 43 compares the location information of the brake-on point Pbrk set by the deceleration-operation-point calculating unit 42 with the current position, when the vehicle 2 reaches the brake-on point Pbrk or within a predetermined range at the near side of the brake-on point Pbrk, the deceleration-assistance control unit 43 controls the HMI device 5 to present the driving assistance information, which prompts the brake-on operation, to the driver.

Physically, the ECU 4 is an electronic circuit that mainly includes a well-known microcomputer, which includes a central processing unit (CPU), a random access memory (RAM), a read only memory (ROM), an interface, and similar member. The above-described respective functions of the ECU 4 are achieved such that the application program held in the ROM is loaded onto the RAM and executed by the CPU so as to operate various devices inside the vehicle 2 under the control of the CPU and perform read and write of data in the RAM and the ROM.

The HMI device 5 is an assistance device that can output the driving assistance information, which is the information for assisting the driving of the vehicle 2, and is a unit that, for example, provides the driving assistance information to the driver. The HMI device 5 is an in-vehicle device, and includes, for example, a display device (visual-information display device), a speaker (audio-information output device), and similar member, which are disposed in the vehicle interior of the vehicle 2. The HMI device 5 outputs visual information (graphic information and character information), audio information (voice information and sound information), and similar information to provide the driving assistance information to the driver, so as to guide the driving operation of the driver. The HMI device 5 provides these pieces of information so as to assist achieving the target value by driving operation of the driver. The HMI device 5 is electrically coupled to the ECU 4 and controlled by this ECU 4. Especially in this embodiment, the HMI device 5 presents the driving assistance information (accelerator off and brake on) related to the deceleration operation generated by the deceleration-assistance control unit 43 to the driver, so as to prompt the deceleration operation for stopping the vehicle 2 at the stop point Ps. Here, the HMI device 5 may employ an existing device such as a display device and a speaker of a navigation system and similar member, or may have a configuration that includes a tactile-information output device, which outputs tactile information such as a steering wheel vibration, a seat vibration, and a pedal reaction force, and similar member.

The deceleration-assistance control unit 43 of the ECU 4 and the HMI device 5 functions as information presentation means that presents the driving assistance information, which prompts the deceleration operation, to the driver of the vehicle 2, corresponding to the calculated timing.

Next, a description will be given of the operation of the driving assistance apparatus 1 according to this embodiment with reference to FIG. 5. FIG. 5 is a flowchart of a stop-operation assistance process executed by the driving assistance apparatus according to this embodiment.

Firstly, when approaching of the vehicle 2 to the service providing section of a driving assistance service is detected (in step S01) and then the stop point Ps is detected within the service providing section (in step S02), the brake-on-vehicle-speed estimation unit 41 acquires the current approaching vehicle speed Vin of the vehicle 2 to the service providing section and the road surface gradient θ of the service providing section from the state detection device 3 (in step S03). Here, the approaching vehicle speed Vin can employ speed information such as the instantaneous speed at the time point when the vehicle 2 approaches the service providing section, the average speed before and after the approaching, and the instantaneous speed or the average speed at the point at the near side of the running route from the stop point Ps by a predetermined distance. The road surface gradient θ can employ, for example, the average value of the road surface gradients over the entire service providing section.

Based on the approaching vehicle speed Vin and the road surface gradient θ acquired in step S03, the brake-on vehicle speed Vbrk is estimated (in step S04). The brake-on-vehicle-speed estimation unit 41 assigns the approaching vehicle speed Vin and the road surface gradient θ acquired in step S03 to the above-described formula (1), so as to allow calculating the brake-on vehicle speed Vbrk. The brake-on-vehicle-speed estimation unit 41 outputs the information of the calculated brake-on vehicle speed Vbrk to the deceleration-operation-point calculating unit 42.

Subsequently, the deceleration-operation-point calculating unit 42 calculates the location information of the brake-on point Pbrk and the accelerator-off point Paoff (in step S05). As described with reference to FIG. 4, the deceleration-operation-point calculating unit 42 predicts the location information of the brake-on point Pbrk where the brake-on operation is to be started based on the location information of the stop point Ps and the brake-on vehicle speed Vbrk calculated by the brake-on-vehicle-speed estimation unit 41 in step S04. The deceleration-operation-point calculating unit 42 estimates the location information of the accelerator-off point Paoff where the accelerator-off operation is to be started, based on the location information of the stop point Ps, the brake-on vehicle speed Vbrk, and the location information of the brake-on point Pbrk. The deceleration-operation-point calculating unit 42 outputs the calculated location information of the accelerator-off point Paoff and the brake-on point Pbrk to the deceleration-assistance control unit 43.

Subsequently, the deceleration-assistance control unit 43 determines whether or not the vehicle 2 reaches the accelerator-off point Paoff (in step S06). For example, the deceleration-assistance control unit 43 compares the current running position of the vehicle 2, which is acquired from the state detection device 3, with the location information of the accelerator-off point Paoff, which is calculated in step S05, so as to allow detecting that the vehicle 2 reaches the accelerator-off point Paoff. In the case where the vehicle 2 does not reach the accelerator-off point Paoff (No in step S06), the process stands by for transition to the subsequent process until the vehicle 2 reaches the accelerator-off point Paoff. On the other hand, in the case where the vehicle 2 reaches the accelerator-off point Paoff (Yes in step S06), the HMI device 5 is controlled such that the HMI device 5 provides the driving assistance information for prompting the accelerator-off operation to the driver so as to teach the accelerator-off operation to the driver (in step S07).

Furthermore, the deceleration-assistance control unit 43 determines whether or not the vehicle 2 reaches the brake-on point Pbrk (in step S08). For example, the deceleration-assistance control unit 43 compares the current running position of the vehicle 2, which is acquired from the state detection device 3, with the location information of the brake-on point Pbrk, which is calculated in step S05, so as to allow detecting that the vehicle 2 reaches the brake-on point Pbrk. In the case where the vehicle 2 does not reach the brake-on point Pbrk (No in step S08), the process stands by for transition to the subsequent process until the vehicle 2 reaches the brake-on point Pbrk. On the other hand, in the case where it is determined that the vehicle 2 reaches the brake-on point Pbrk (Yes in step S08), the HMI device 5 is controlled such that the HMI device 5 provides the driving assistance information for prompting the brake-on operation to the driver so as to teach the brake-on operation to the driver (in step S09).

Next, a description will be given of the effect of the driving assistance apparatus 1 according to this embodiment.

The driving assistance apparatus 1 according to this embodiment includes the brake-on-vehicle-speed estimation unit 41, the deceleration-operation-point calculating unit 42, the deceleration-assistance control unit 43, and the HMI device 5. The brake-on-vehicle-speed estimation unit 41 estimates the brake-on vehicle speed Vbrk, which is the vehicle speed at which the driver of the vehicle 2 starts the brake operation, based on the road surface gradient θ and the approaching vehicle speed Vin. The deceleration-operation-point calculating unit 42 calculates the location information of the deceleration-operation point where the driver of the vehicle 2 starts the deceleration operation, based on the estimated brake-on vehicle speed Vbrk. The deceleration-assistance control unit 43 and the HMI device 5 present the driving assistance information for prompting the deceleration operation to the driver of the vehicle 2 corresponding to the calculated location information of the deceleration-operation point and the running position of the vehicle 2, as the information presentation means.

As described with reference to FIGS. 2 and 3, the brake-on vehicle speed Vbrk is the parameter that varies corresponding to the information such as the road surface gradient θ related to the deceleration of the vehicle, the approaching vehicle speed Vin of the vehicle 2, and similar information. In this embodiment, calculation of the brake-on vehicle speed Vbrk using the above-described formula (1) based on the road surface gradient θ and the approaching vehicle speed Vin allows accurately estimating the brake-on vehicle speed Vbrk corresponding to the running condition of the vehicle 2 and the road surface condition. This allows presenting the driving assistance information for prompting the driver to perform the deceleration operation at the appropriate timing, so as to provide the timing for teaching the deceleration operation close to the feeling of the driver. With this result, when the driving assistance for teaching the deceleration operation to the driver is performed, the driver can be less likely to feel uncomfortable.

In the driving assistance apparatus 1 according to this embodiment, the deceleration operation includes the accelerator-off operation and the brake-on operation. The deceleration-operation point includes the accelerator-off point Paoff where the accelerator-off operation is to be started and the brake-on point Pbrk where the brake-on operation is to be started. The deceleration-operation-point calculating unit 42 predicts the brake-on point Pbrk based on the location information of the stop point Ps where the vehicle 2 is stopped and the brake-on vehicle speed Vbrk, calculates the accelerator-off distance Laoff reachable after execution of the accelerator-off operation until the vehicle speed of the vehicle 2 is decelerated to the brake-on vehicle speed Vbrk, and sets the position at the near side with respect to the brake-on point Pbrk by the accelerator-off distance Laoff as the accelerator-off point Paoff. The deceleration-assistance control unit 43 and the HMI device 5 as the information presentation means present the driving assistance information for prompting the accelerator-off operation to the driver, corresponding to the location information of the set accelerator-off point Paoff and the running position of the vehicle 2.

This configuration allows improving the estimation accuracy of the braking distance Lbrk and the accelerator-off distance Laoff based on the accurately-estimated the brake-on vehicle speed Vbrk, so as to accurately estimate the accelerator-off point Paoff and the brake-on point Pbrk. This allows presenting the driving assistance information for prompting the driver to perform the deceleration operation (the accelerator-off operation) at a more appropriate timing.

The embodiment of the present invention is described above. It should be understood that the present embodiment is in all respects illustrative and is not intended to limit the technical scope of the present invention. The described embodiment can be performed in other various forms, various kinds of removals, replacements and modifications may be possible without departing from the spirit of the present invention. The embodiment and the modification are intended to be embraced in the range and gist of the present invention, and are intended to be embraced in the invention disclosed in the range of the claims and the equivalency thereof.

While in the above-described embodiment the configuration that calculates the brake-on vehicle speed Vbrk based on the approaching vehicle speed Vin and the road surface gradient θ has been described, the road surface gradient θ is one example of "the information related to the deceleration of the vehicle" and may be replaced by other information related to the deceleration of the vehicle, for example, a road load (running resistance), an air resistance, and similar parameter. The brake-on vehicle speed Vbrk tends to be proportional to the other information related to the deceleration of the vehicle, for example, the road load (the running resistance), the air resistance, and similar parameter other than the road surface gradient θ. Accordingly, the brake-on vehicle speed Vbrk can be calculated with the formula (1) by replacement of the road surface gradient θ by the other information and replacement of the parameter value γ multiplied by the road surface gradient θ by an appropriate coefficient in the above-described formula (1). A plurality of pieces of information related to the deceleration of the vehicle may be used for the estimation of the brake-on vehicle speed Vbrk. Here, the road load (running resistance) is the resistance generated between the driving source and the road surface, and includes the road surface resistance generated between the tire and the road surface, the resistance (mechanical loss) generated in the drive system that transmits the driving force generated in the driving source, and similar resistance.

In the above-described embodiment, the configuration where the deceleration-assistance control unit 43 and the HMI device 5 as the information presentation means present the driving assistance information for prompting the accelerator-off operation and the brake-on operation to the driver in the driving assistance apparatus 1 has been described. However, the configuration that presents the driving assistance information related to the accelerator-off operation alone may be used.

REFERENCE SIGNS LIST 1 driving assistance apparatus
2 vehicle
4 ECU
41 brake-on-vehicle-speed estimation unit (estimation means)
42 deceleration-operation-point calculating unit (deceleration-operation-point calculation means)
43 deceleration-assistance control unit (information presentation means)
5 HMI device (information presentation means)
Vin approaching vehicle speed (vehicle-speed information)
θ road surface gradient (information related to deceleration of vehicle)
Vbrk brake-on vehicle speed
Ps stop point
Paoff accelerator-off point
Pbrk brake-on point
Pbrk brake-on point
Laoff accelerator-off distance
Lbrk braking distance

The invention claimed is:

1. A driving assistance apparatus of a road vehicle, comprising:
a state detection device configured to detect a stop point located ahead of a present location of the vehicle while the vehicle travels on a road along a predetermined running route, wherein the stop point is detected based on information obtained by a map-information storage unit and an inter-road/vehicle communication unit, and wherein the state detection device is further configured to obtain information along the predetermined running route from the present location of the vehicle up to a location of the stop point, wherein the information includes a road surface gradient;
an electronic control unit (ECU) programmed to:
obtain a current speed of the vehicle at a predetermined distance before the stop point;
estimate a vehicle speed at which a driver of the vehicle should start a brake operation in order to stop the vehicle at the stop point based on the speed of the vehicle obtained at the predetermined distance before the stop point and the road surface gradient obtained from the state detection device; and
calculate location information of a deceleration-operation point where the driver of the vehicle should start a deceleration operation, based on the estimated vehicle speed for starting the brake operation and the information along the predetermined running route that was obtained by the state detection device;
determine whether a current location of the vehicle that is acquired from the state detection device has reached the calculated location information of the deceleration-operation point;
an information presentation unit configured to, when the vehicle reaches the deceleration-operation-point, present driving assistance information for prompting the driver of the vehicle to perform the deceleration operation.

2. The driving assistance apparatus according to claim 1, wherein
the deceleration operation includes an accelerator-off operation and a brake-on operation,
the deceleration-operation point includes an accelerator-off point where the accelerator-off operation is to be started and a brake-on point where the brake-on operation is to be started,
the ECU is further programmed to:
predict the brake-on point based on location information of the stop point where the vehicle is to be stopped and the estimated vehicle speed for starting the brake operation;
calculate a distance reachable after execution of the accelerator-off operation until the vehicle speed of the vehicle is decelerated to the estimated vehicle speed for starting the brake operation; and
set a position as the accelerator-off point, which is based on the calculated distance reachable after execution of the accelerator-off operation; and
the information presentation unit is configured to present the driving assistance information for prompting the accelerator-off operation to the driver corresponding to location information of the set accelerator-off point and the running position of the vehicle.

3. The driving assistance apparatus according to claim 1, wherein
the information related to deceleration further includes a road load, and an air resistance.

4. The driving assistance apparatus according to claim 2, wherein
the information related to deceleration further includes a road load, and an air resistance.

5. A driving assistance apparatus of a road vehicle, comprising:
a state detection device configured to detect a stop point located ahead of a present location of the vehicle while the vehicle travels on a road along a predetermined running route, wherein the stop point is detected based on information obtained by a map-information storage unit and an inter-road/vehicle communication unit, and wherein the state detection device is further configured to obtain a road surface gradient along the predetermined running route from the present location of the vehicle up to a location of the stop point;
an HMI device that presents information to a driver of the road vehicle; and
an electronic control unit (ECU) programmed to:
determine that the stop point is located ahead of the present location of the vehicle while the vehicle travels;
upon determination that the stop point is located ahead of the present location of the vehicle, acquire the road surface gradient from the state detection device and acquire an approaching vehicle speed of the vehicle;
estimate a vehicle speed at which a driver of the vehicle should start a brake operation in order to stop the vehicle at the stop point based on the approaching vehicle speed and the road surface gradient;

calculate a location on the road where the driver of the vehicle should start a brake on operation at the estimated vehicle speed in order to stop the vehicle at the stop point;

calculate a location on the road where the driver of the vehicle should start an accelerator off operation in order to reach the location of the brake on operation at the estimated vehicle speed based on a deceleration to be generated by an engine brake during freewheeling after the accelerator off operation is started;

when a current location of the vehicle reaches the calculated location for the accelerator off position, control the HMI device to notify the driver to execute the accelerator off operation; and when a current location of the vehicle reaches the calculated location for the brake on operation, control the HMI device to notify the driver to execute the brake on operation.

* * * * *